United States Patent
Keefer et al.

(10) Patent No.: US 6,751,540 B2
(45) Date of Patent: Jun. 15, 2004

(54) METHOD AND APPARATUS FOR DESIGN PLACEMENT FOR EARTHMOVING APPLICATIONS

(75) Inventors: Claude W. Keefer, Elmwood, IL (US); Craig L. Koehrsen, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 108 days.

(21) Appl. No.: 09/974,286

(22) Filed: Oct. 10, 2001

(65) Prior Publication Data

US 2003/0069679 A1 Apr. 10, 2003

(51) Int. Cl.$^7$ .......................... G06F 19/00; G06G 7/00; G06G 7/78; G01C 22/00
(52) U.S. Cl. .......................... 701/50; 701/25; 701/202; 701/211; 701/212; 345/630
(58) Field of Search .............................. 701/50, 23, 25, 701/202, 205, 208, 211, 212; 345/630

(56) References Cited

U.S. PATENT DOCUMENTS

| | | | |
|---|---|---|---|
| 5,375,663 A | 12/1994 | Teach | |
| 5,517,419 A | 5/1996 | Lanckton et al. | |
| 5,553,211 A * | 9/1996 | Uotani | 345/641 |
| 5,560,431 A | 10/1996 | Stratton | |
| 5,631,658 A * | 5/1997 | Gudat et al. | 342/457 |
| 5,964,298 A | 10/1999 | Greenspun | |
| 6,037,901 A | 3/2000 | Devier et al. | |
| 6,191,732 B1 | 2/2001 | Carlson et al. | |
| 6,195,604 B1 | 2/2001 | Moore et al. | |
| 6,212,471 B1 | 4/2001 | Stiles et al. | |
| 6,295,066 B1 * | 9/2001 | Tanizaki et al. | 345/419 |

* cited by examiner

Primary Examiner—William A Cuchlinski, Jr.
Assistant Examiner—Brian J Broadhead
(74) Attorney, Agent, or Firm—Kelsey L Milman; Dennis C Skarvan; Steve D Lundquist

(57) ABSTRACT

Method and apparatus for storing earthwork design templates in an on-board system on a work machine. The machine operator may select one or more of the templates and place and orient the template on a topographic map displayed on a screen. The operator may adjust the position and heading in the x-y plane and adjust the elevation, slope, and cross slope of the template relative to the map.

19 Claims, 5 Drawing Sheets

METHOD AND APPARATUS FOR DESIGN PLACEMENT FOR EARTHMOVING APPLICATIONS

TECHNICAL FIELD

The present invention relates to the design and construction of earthworks by work machines and, more particularly, to the development and storage of earthwork design templates for placement by the machine operator on a topographic map.

BACKGROUND

Traditionally, the creation of earthworks by work machines was a labor-intensive task, requiring manual surveys of the terrain and the placing of stakes to delineate the desired location and orientation of the earthwork. In recent years, with the advent of GPS (global positioning system) and other three-dimensional positioning technology in conjunction with work machines, the task of creating earthworks has been greatly simplified. Utilizing GPS or other positioning technology, as a work machine traverses the site, a topographic map of the site is created and stored electronically in a computer system onboard the machine and, oftentimes, in a back office computer system. Then, utilizing software in the office, one or more desired earthworks, such as airstrips, gun emplacements, or the like, may be designed, stored in individual electronic files, and positioned on the topographic map. The map, including the desired earthworks, is communicated to the computer system onboard the work machine for viewing by the machine operator, who, using the map as a reference, constructs the earthworks.

However, these systems are limited in that the earthwork designs are usually stored in the office computer system and are placed on the topographic map utilizing the office computer system. In many situations, such as for military operations or for smaller construction or mining sites, it would be desirable to design the earthwork placement at the worksite, thus avoiding the need to have an office system in communication with the work machine and the delay inherent in designing the placement offsite and allowing the design to be quickly revised, if needed.

SUMMARY OF THE INVENTION

The aforementioned problems are overcome by the present invention wherein at least one design template is electronically stored on an onboard computer system on a work machine. The operator of the machine may select one or more design templates and place the templates on a topographic map, also electronically stored in the onboard computer system. To place the template, the operator translates the template into position, orients the direction of the template, and determines the appropriate elevation of the template on the topographic map.

DETAILED DESCRIPTION

Figure 1:
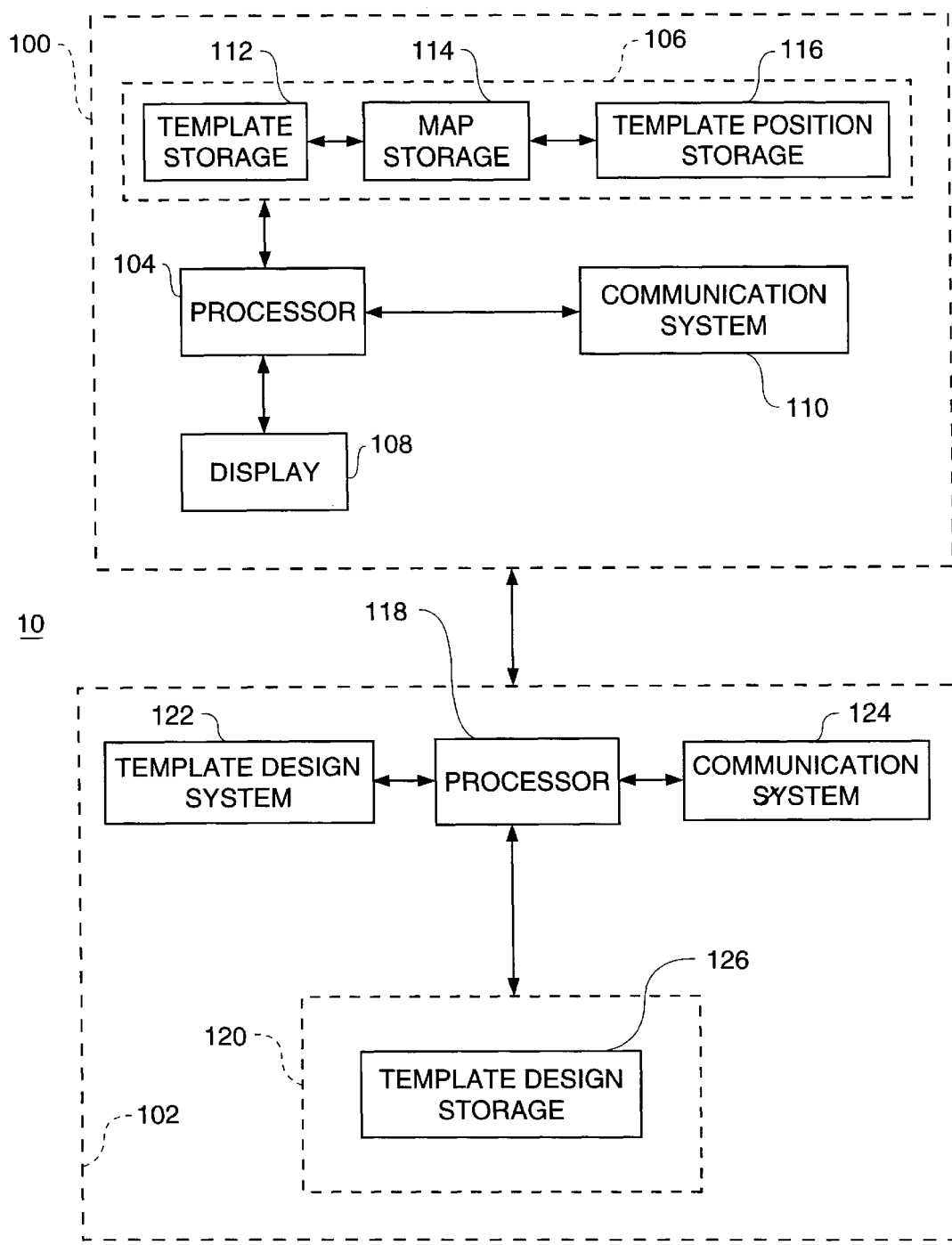
FIG. 1 is a diagrammatic representation of the present invention.

A system for storing and placing design templates according to the preferred embodiment of the present invention is illustrated in FIG. 1 and generally designated 10. For purposes of this disclosure, the present invention is described in connection with a work machine, such as a track-type tractor, road grader, paver, or the like. In addition, the present invention is described in connection with the design and placement of artillery emplacements. However, the present invention is equally well-suited for use with other means for planning and altering terrain and for many terrain-altering uses, such as mining operations, constructions sites, or the like.

I. The Design Placement System

The system 10 preferably includes an onboard component 100 and an office component 102. The onboard component 100 is preferably mounted on the work machine such that it is accessible by an operator of the machine. Alternatively, the onboard component 100 may be located remotely from the work machine. In the preferred embodiment, the onboard component 100 includes a processor 104, data storage system 106, display 108, and communications system 110.

The processor 104 controls the functions of the onboard component 100 and processes data received from or sent to the office component 102. The data storage system 106 includes template storage 112 for electronically storing at least one design template, map storage 114 for storing a topography map which encompasses the general area of ground to be worked, and template position storage 116 for storing the position in three-dimensions of the at least one design template on the map. The data storage system 106 is accessed by the processor 104.

The display 108 provides the operator with visual representations of the data stored in the data storage system 106 to guide the operator in operating the machine to create the earthworks. In addition, the display 108 preferably accepts input from the operator to allow the operator to modify the template position data stored in the data storage system 106, such as by being touch-sensitive. Alternatively, a keyboard or other input device (not shown) may be included in the on-board component 100 and connected to the processor 104 to allow the operator to provide input and modify the template position data.

The communication system 110 communicates with the office component 102 of the system 10. Preferably, the communication system 110 communicates by wireless means, such as satellite or cellular technology, which are well known by those skilled in the art.

The office component 102 of the system 10 is preferably located remotely from the work machine. The office component 102 includes a processor 118, a data storage system 120, a design system 122, and a communications system 124.

The processor 118 controls the functions of the office component 102 and processes data received from or sent to the onboard component 100. The data storage system 120 includes a design template storage 126 for electronically storing at least one design template. The template design system 122, preferably through input by an operator, designs the earthwork design templates. The communication system 124 communicates with the onboard component 100 of the system 10. Preferably, the communication system 124 communicates by wireless means, such as satellite or cellular technology, which are well known by those skilled in the art.

II. Operation of the Design Placement System

Operation of design placement system 10 is controlled by software that is programmed into the onboard and office processors 104 and 118 by external means. Alternately, the program can be implemented via hardware or any other programming technique. Creation of this software based upon the description set forth in the specification is within the capabilities of one having ordinary skill in the programming arts.

Figure 2:
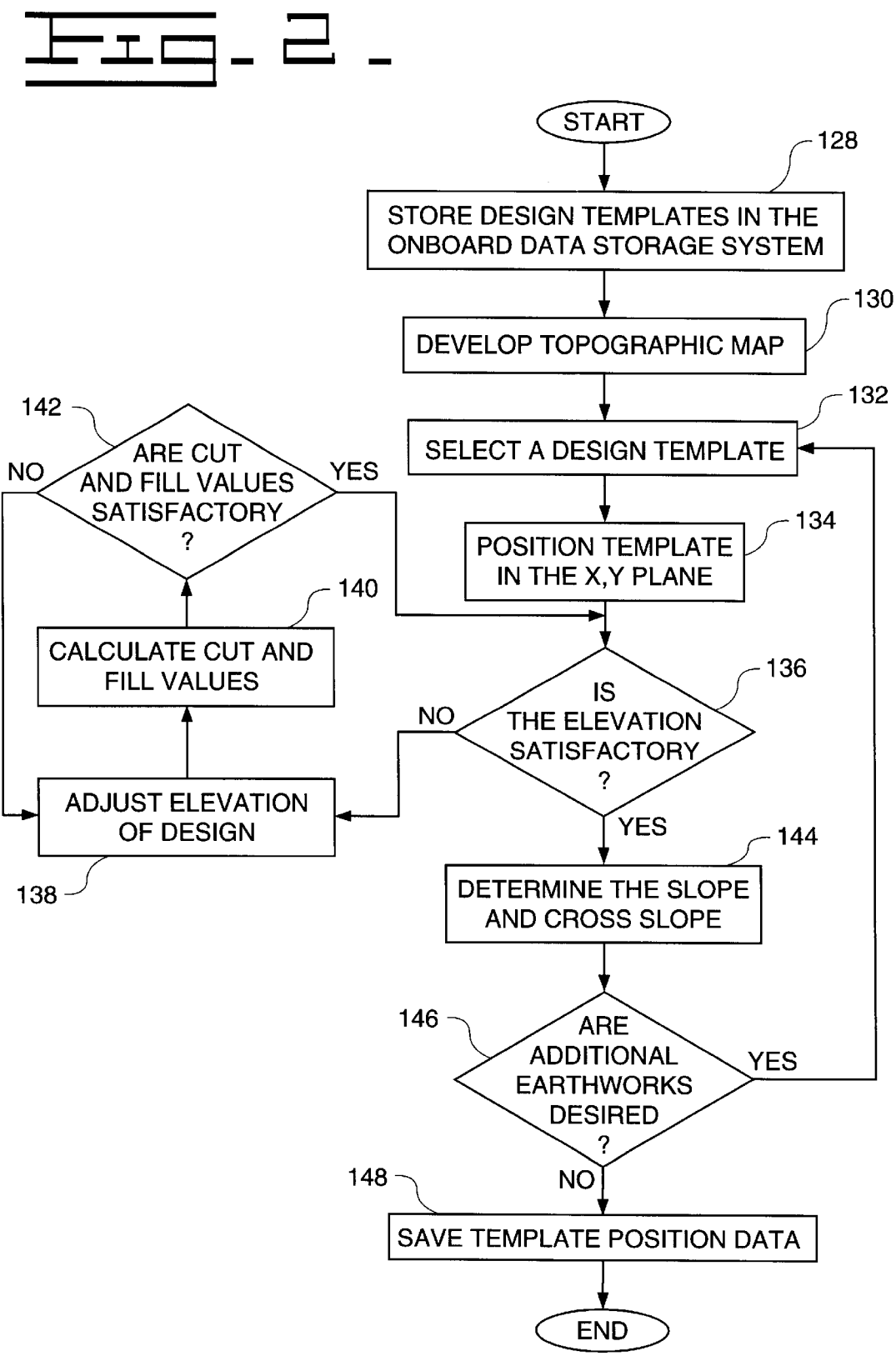
FIG. 2 is a flow diagram illustrating the placement and orientation process of the present invention.

One or more work machines are delivered to a work site. As seen in FIG. 2, either prior or subsequent to their delivery, at least one design template is stored in the data storage system 106 of the onboard component 100 on the work machine 128. Preferably, the at least one design template is created off-site utilizing the office component 102 of the system 10. The template is created within the template design system 122, a process well known to those skilled in the art and which will not be described herein. The template is stored in the data storage system 120 of the office component 102.

When an electronic copy of the template is to be transferred to the onboard data storage system 106, one component 100 or 102 contacts the other by way of its communication system 110 or 124. Either the onboard or the office component 100 or 102 may initiate contact with the other. A copy of the design template is transferred via the communication systems 110 and 124 to the onboard data storage system 106, where it is stored in the design template storage 112. Alternatively, the design template may be transferred to the onboard component 100 by other means, such as by transferring the file by means of a disk or other fixed media.

In the next step, a topographic map of the terrain is developed 130 and stored in the map storage 114 in the data storage system 106 of the onboard component 100. The methods of developing a topographic map are well known to those of ordinary skill in the art and will not be described herein. Alternatively, the topographic map may be developed prior to the transfer of the design template to the onboard component 100.

Figure 3:
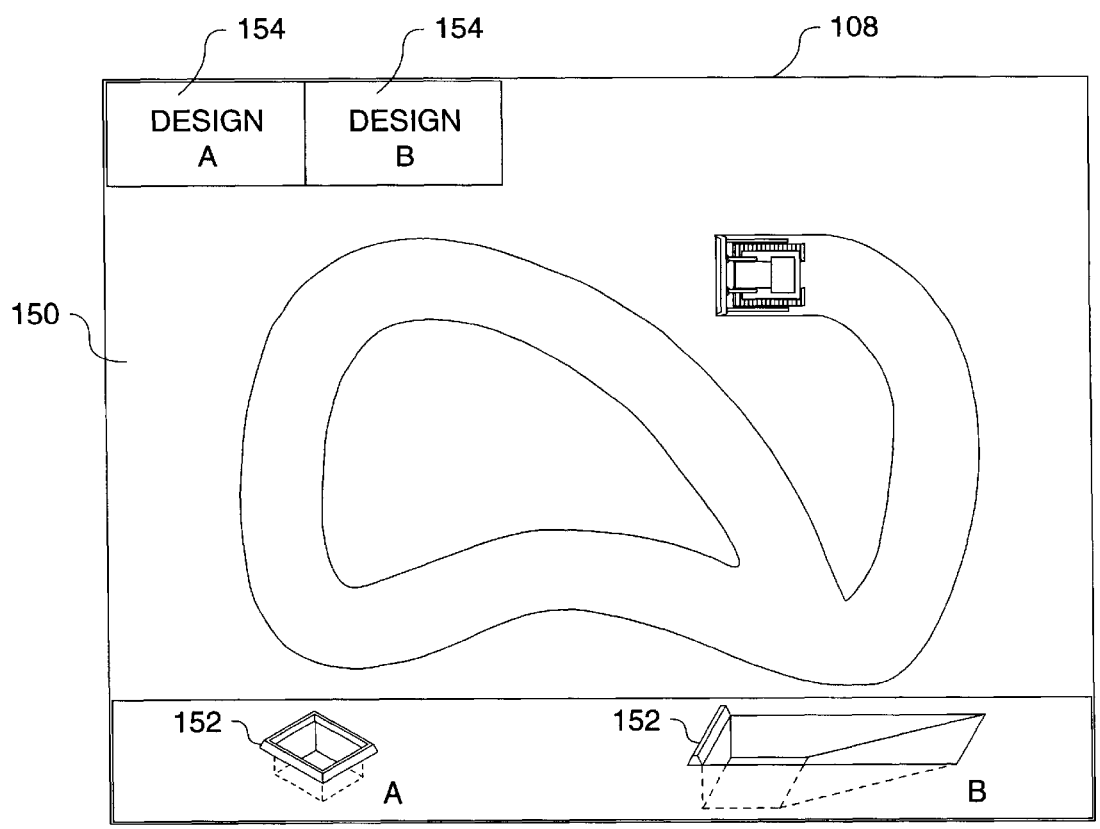
FIG. 3 is a representation of a screen illustrating the selection of a pre-designed earthwork.

Once the map is completed, the display 108 of the onboard component 100 preferably displays a visual representation of the of the map data 150 and the template data 152 (hereinafter known as the map and the template) stored in the data storage system 106, as seen in FIG. 3. In FIG. 3, two design templates 152 are shown as being stored and displayed by the onboard component 100. However, the present invention anticipates that additional or fewer templates 152 may be stored and displayed.

Next, the operator selects one of the design templates 152, preferably by touching the display 132. Preferably, the stored templates 152 will be shown on the display 108 and a selection of corresponding buttons 154 will be displayed across the top of the display 108. If the display 108 is touch-sensitive, the desired template 152 may be selected by touching the appropriate button 154. Alternatively, a keyboard (not shown) or other input device may be included in the onboard component 100 to accept operator input and to allow the operator to select one of the design templates 152 and otherwise interact with the onboard component 100.

Figure 4:
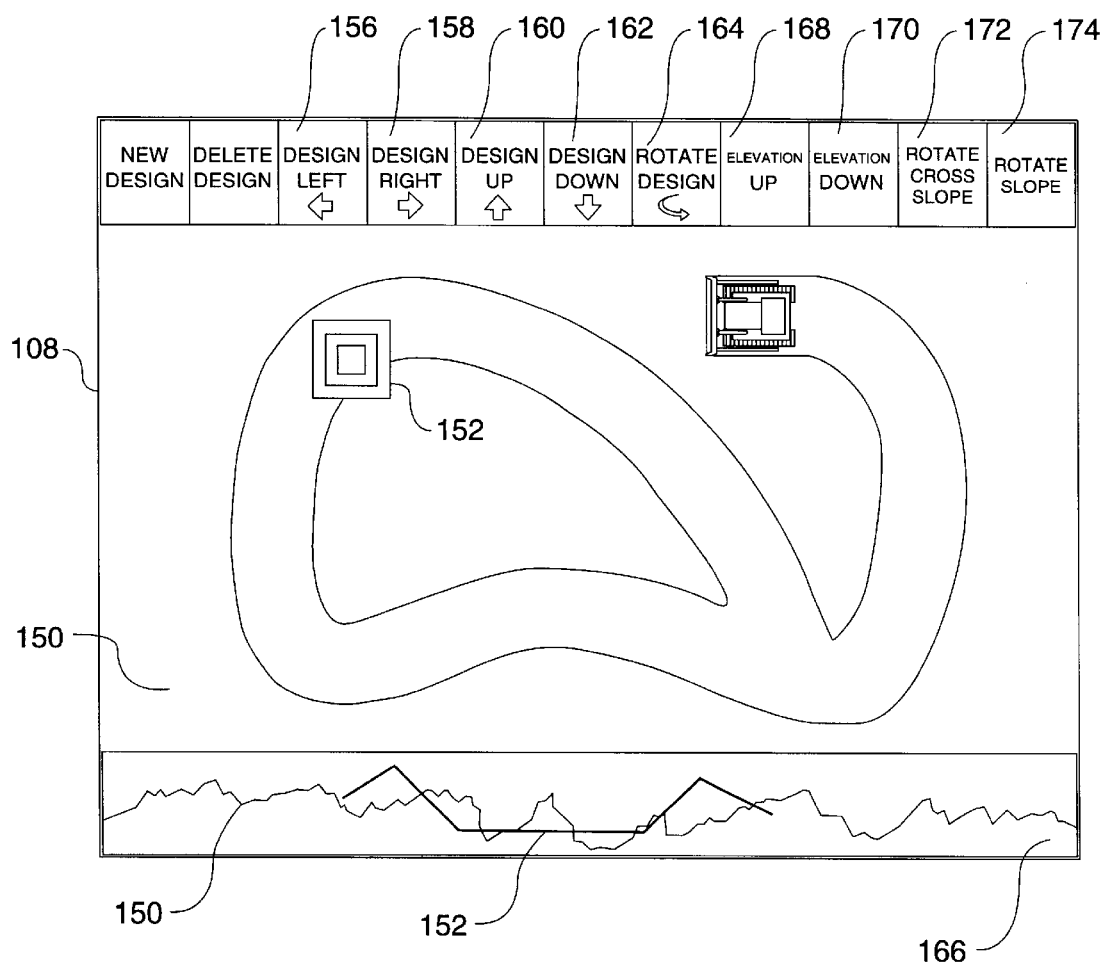
FIG. 4 is a representation of a screen illustrating the placement of a pre-designed earthwork.

Once the template 152 is selected, the design template 152 is shown on the display 108 overlaid on the map 150. In the next step the operator positions the template 152 in the x-y plane in a desired location on the map 150, as seen in FIG. 4 134. Preferably, the display 108, being touch-sensitive, displays a series of buttons 156, 158, 160, and 162 to allow the operator to move the design horizontally or vertically on the two-dimensional representation of the map 150.

To position, or translate, the template 152 to the desired location, at least one anchor point is selected on the template 152. This point may be designated by the operator of the machine, or it may have been designated during the creation of the design template 152 in the template design system 122. Next, an origin point is selected on the map 150. This selection is preferably made by the processor 104 based upon the input of the operator utilizing the translation buttons 156, 158, 160, and 162. Once the origin point is selected, the template 152 is moved across the map 150 such that its anchor point overlays the origin point. If the operator desires to adjust the horizontal or vertical position of the template 152, he may, by pressing the buttons 156, 158, 160, or 162 on the display 108, further adjust the position of the origin point. As the origin point moves, the anchor point, and thus the template 152 itself, moves such that the anchor point continues to overlay the origin point.

To more accurately position the template 152, a design heading is selected. The operator selects the heading by pressing the rotate design button 164 on the display 108. Preferably, the template 152 is initially placed on the map 150 with a heading of zero such that it is oriented along the y-axis. Alternatively, the template 152 may be initially positioned on the map 130 to correspond with the current machine heading. As the operator pushes the rotate design button 164, the template 152 rotates about its anchor point. Alternatively, a second point on the template 152 may be designated as a rotation point. Each push of the button 164 preferably corresponds to a fixed number of degrees of rotation, such as each push of the button 164 being equivalent to 12°.

As seen in FIG. 2, once the template 152 is translated and oriented in the desired position, the next step is to determine if the elevation, or the position of the template 152 along the z-axis, is satisfactory 136. The operator views the profile view 166 in the lower portion of the display 108. If the operator is not satisfied with the elevation, he may adjust the elevation of the design template 152 via the elevation up and down buttons 168 and 170 on the display 138. As he does so, revised cut and fill volumes are calculated 140 and displayed on the profile view 166. Preferably, each push of the buttons 168 and 170 corresponds to the template 152 being elevated or lowered a fixed distance; for example, each push of the buttons 168 and 170 may move the template 152 one foot.

In the next step, the slope value and cross slope value are selected to orient the template for three-dimensional positioning 144. These values may be automatically selected by the processor 104 if the template 152 is to be kept level, or they may be selected by the operator utilizing the rotate slope and rotate cross slope buttons 172 and 174. As the operator pushes the buttons 172 and 174, the template 152 rotates out of the x-y plane, with, preferably, each push of the buttons 172 and 174 corresponding to a fixed number of degrees; for example, each push of the buttons 172 and 174 may correspond to 3° of rotation. The template 152 may rotate about its longitudinal center axis as the cross slope is changed and about its transverse center axis as the slope is changed. Alternatively, the template 152 may rotate about axes containing the anchor, or other designated, point. As the template 152 is oriented out of the x-y plane, the change in slope preferably can be seen by the operator in the profile view 166 seen along the bottom of the display 108, in which the profile of the earthwork is overlaid on the profile of topography of the site. Thus, the operator may elevate and orient the template 152 to take advantage of the natural terrain, thus minimizing the excavation and fill work needed when creating the design at the site.

Figure 5:
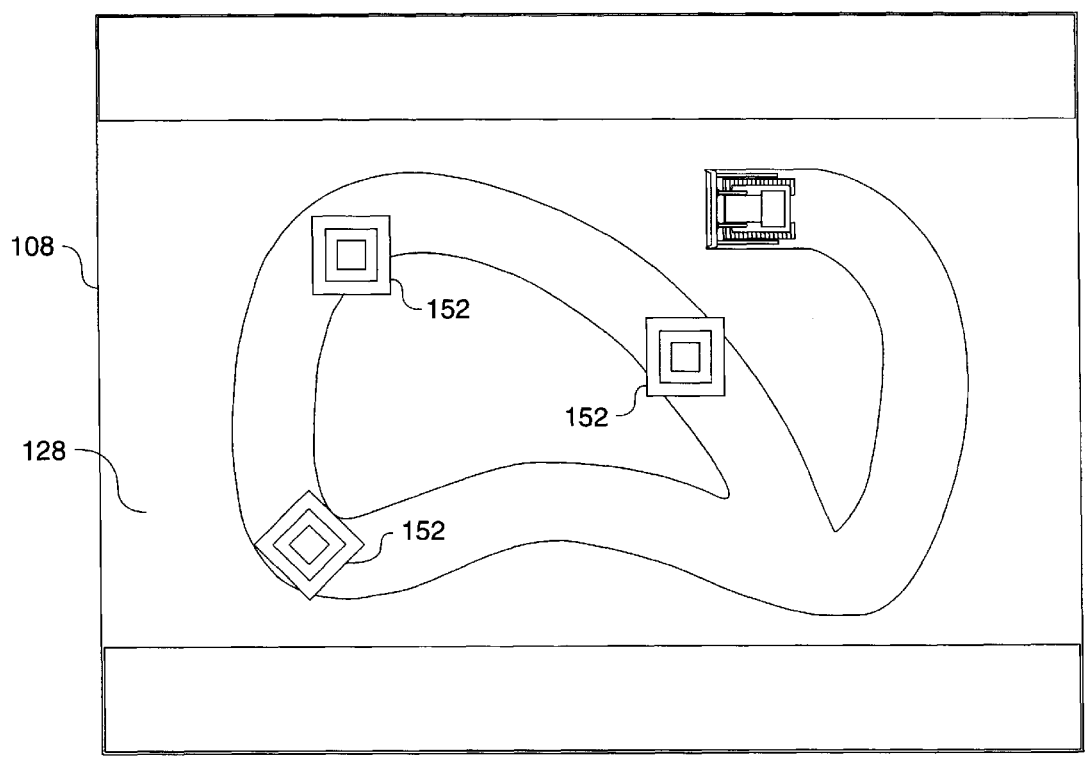
FIG. 5 is a representation of a screen illustrating the completed placement and orientation of a plurality of pre-designed earthworks.

Once the operator is satisfied with the placement of the template 152, he may repeat the process by selecting the same or another template 152 to place on the map 150 if additional earthworks are required, as seen in FIG. 5. Otherwise, the location of the placed templates 152 may be stored in the template position storage 112 in the data storage system 106, if so desired.

Then, guided by the topographic map 150 and the placed templates 152, the operator may create the earthworks at the worksite.

INDUSTRIAL APPLICABILITY

The present invention provides an efficient means for designing earthwork placement at a work site. In many situations, it is inconvenient to connect work machines to a back office system to download the earthwork layout for the work site, especially as in many instances work machines may be brought into small sites to construct a few earthworks (perhaps a task of a few hours duration).

Rather than developing the map and uploading it to an office system where the earthworks are placed on the map, the earthworks layout may be designed "on the fly." Standard design templates may be stored on the machine; then when the work machine is delivered to the site, no further communication with the office system is necessary. The topography map may be developed, and the operator may place the standard templates on the map, translating and orienting them to the desired x-y coordinates and adjusting their elevation, slope, and cross slope to suit the overall plan and the current terrain. Then the operator can create the earthworks following the design, all without the delay inherent in waiting for the site design to be completed in an off-site office.

The above descriptions are those of preferred embodiments of the invention. Other aspects, objects, and features of the present invention can be obtained from a study of the drawings, the disclosure, and the appended claims.

What is claimed is:

1. A method for planning earthwork placement for a worksite, the planned earthworks to be constructed by an operator of a work machine, the work machine including an onboard system, comprising the steps of:
   storing electronically at least one design template in a data storage system of said onboard system;
   storing electronically a map in said data storage system;
   positioning by the operator said template on said map; and
   altering by the operator the position of said template relative to said map.

2. The method, as set forth in claim 1, wherein said altering step includes the steps of:
   translating said template in an x-y plane of said map; and
   orienting said template in the x-y plane.

3. The method, as set forth in claim 2, wherein said orienting step includes the step of:
   selecting a design heading for said template.

4. The method, as set forth in claim 2, wherein said translating step includes the steps of:
   selecting an anchor point on said template;
   selecting an origin point on said map; and
   positioning said template on said map wherein said anchor point overlays said origin point.

5. The method, as set forth in claim 4, wherein said orienting step includes the step of:
   rotating said template about said anchor point.

6. The method, as set forth in claim 2, wherein said altering step further includes the steps of:
   altering the elevation of said template relative to said map;
   altering the slope of said template relative to said map; and
   altering the cross slope of said template relative to said map.

7. The method, as set forth in claim 6, further including the step of:
   viewing said elevation in a profile view of said template and said map.

8. The method, as set forth in claim 7, wherein said altered elevation, slope, and cross slope of said template are visible in said profile view.

9. The method, as set forth in claim 1, further including the steps of:
   designing said template on an offboard system; and
   delivering said template to said onboard system.

10. An apparatus for planning earthwork placement for a work site, the planned earthwork to be constructed by an operator of a work machine, comprising:
    an onboard system comprising:
      a data storage system for electronically storing at least one design template of an earthwork and a map of at least one portion of the worksite;
      a display for displaying said template and said map;
      an input device for providing operator input to said processor; and
      a processor for manipulating by operator input a position of said template relative to said map.

11. The apparatus, as set forth in claim 10, further comprising:
    an office system for designing said template, and
    wherein said onboard system further comprises a communication system for communicating with said office system.

12. The apparatus, as set forth in claim 10, wherein said display displays said template overlaid on said map.

13. The apparatus, as set forth in claim 12, wherein said processor translates said template in an x-y plane of said map and orients said template in the x-y plane.

14. The apparatus, as set forth in claim 13, wherein said processor selects an origin point on said map and identifies an anchor point on said template and positions said template on said map wherein said anchor point overlays said origin point.

15. The apparatus, as set forth in claim 14, wherein to orient said template, said processor rotates said template around said anchor point.

16. The apparatus, as set forth in claim 12, wherein said processor alters the elevation of said template relative to said map, wherein said processor alters the slope of said template relative to said map, and wherein said processor alters the cross slope of said template relative to said map.

17. The apparatus, as set forth in claim 16, wherein said display further includes a profile view of said template and said map.

18. An apparatus for planning earthwork placement for a worksite, the planned earthworks to be constructed by an operator of a work machine, the work machine including an onboard system, comprising:
    display means in said onboard system for displaying visual representations of a template of an earthwork and a map of at least a portion of the worksite; and manipulation means in said onboard system for manipulating by the operator said template relative to said map.

19. The apparatus, as set forth in claim 18, wherein said manipulation means further includes:

translation means for translating said template in an x-y plane of said map;

orientation means for orienting said template in the x-y plane;

elevation means for altering the elevation of said template relative to said map;

first alteration means for altering a cross slope of said template relative to said map; and second alteration means for altering a slope of said template relative to said map.

* * * * *